(12) United States Patent
Fulton

(10) Patent No.: US 8,415,910 B2
(45) Date of Patent: Apr. 9, 2013

(54) SWITCH MODULE FOR AN ELECTRIC MACHINE HAVING SWITCHABLE STATOR WINDINGS

(75) Inventor: David A. Fulton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 267 days.

(21) Appl. No.: 12/886,021

(22) Filed: Sep. 20, 2010

(65) Prior Publication Data

US 2012/0068656 A1    Mar. 22, 2012

(51) Int. Cl.
*H02P 25/18*    (2006.01)

(52) U.S. Cl.
USPC ........... 318/497; 318/494; 318/772; 318/767; 318/727

(58) Field of Classification Search ............. 318/497, 318/494, 772, 767, 727
See application file for complete search history.

(56) References Cited

U.S. PATENT DOCUMENTS

| | | | | |
|---|---|---|---|---|
| 5,327,064 A | * | 7/1994 | Arakawa et al. | 318/801 |
| 5,334,898 A | * | 8/1994 | Skybyk | 310/268 |
| 6,115,270 A | * | 9/2000 | Yamane et al. | 363/40 |
| 6,313,598 B1 | * | 11/2001 | Tamba et al. | 318/722 |
| 6,982,530 B2 | * | 1/2006 | Takeuchi | 318/34 |
| 2010/0052584 A1 | * | 3/2010 | Bates et al. | 318/400.11 |

OTHER PUBLICATIONS

Eckart Nipp, "Permanent Magnet Motor Drives with Switched Stator Windings." Royal Institute of Technology, Department of Electric Power Engineering Electrical Machines and Drives, Stockholm 1999, TRITA-EMD-9905, ISSN-1102-0172; 315 pages.

P.J. Otaduy et al., "Advanced Vehicle with Dynamically Reconfigurable Number of Stator Turns." Oak Ridge National Laboratory; Presented at the 5th IEEE Vehicle Power and Propulsion Conference; Dearborn, Michigan; Sep. 7-11, 2009, 6 pages.

* cited by examiner

*Primary Examiner* — Walter Benson
*Assistant Examiner* — David Luo
(74) *Attorney, Agent, or Firm* — Cantor Colburn LLP

(57) ABSTRACT

An electric machine including a housing and a stator arranged within the housing. The stator includes a plurality of stator windings that define a number of phases. A switch module is mounted at the housing. The switch module includes a plurality of switch members that are operatively connected to the plurality of stator windings. The plurality of switch members are configured and disposed to selectively establish one of a first electrical connection configuration and a second electrical connection configuration of the plurality of stator windings.

16 Claims, 2 Drawing Sheets

SWITCH MODULE FOR AN ELECTRIC MACHINE HAVING SWITCHABLE STATOR WINDINGS

BACKGROUND OF THE INVENTION

Exemplary embodiments are directed to the art of electric machines and, more particularly, to a switch module for an electric machine having switchable stator windings.

A wide array of devices rely on electric machines for power. Electric powered transportation and hybrid electric machines are currently becoming more common as viable alternatives to fossil fuel powered vehicles. As electric powered vehicles grow in popularity, there is a need to enhance electric motor output efficiency.

Currently, electric motor output falls into a defined efficiency range. Greater efficiency is achieved when the electric motor is operating at base speed. Operating outside the base speed is less than optimal. That is, under various operating conditions, output torque from the electric motor may be outside a desired operating envelope. One area of current exploration to improve electric motor performance is inverter technology. Adjustable speed motor control inverters are currently used to power traction motors employed in certain electric and hybrid electric vehicles. Improving motor control inverter technology is one path toward enhanced operational efficiency of electric motors.

BRIEF DESCRIPTION OF THE INVENTION

Disclosed is an electric machine including a housing and a stator arranged within the housing. The stator includes a plurality of stator windings that define a number of phases. A switch module is mounted at the housing. The switch module includes a plurality of switch members that are operatively connected to the plurality of stator windings. The plurality of switch members are configured and disposed to selectively establish one of a first electrical connection configuration and a second electrical connection configuration of the plurality of stator windings.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
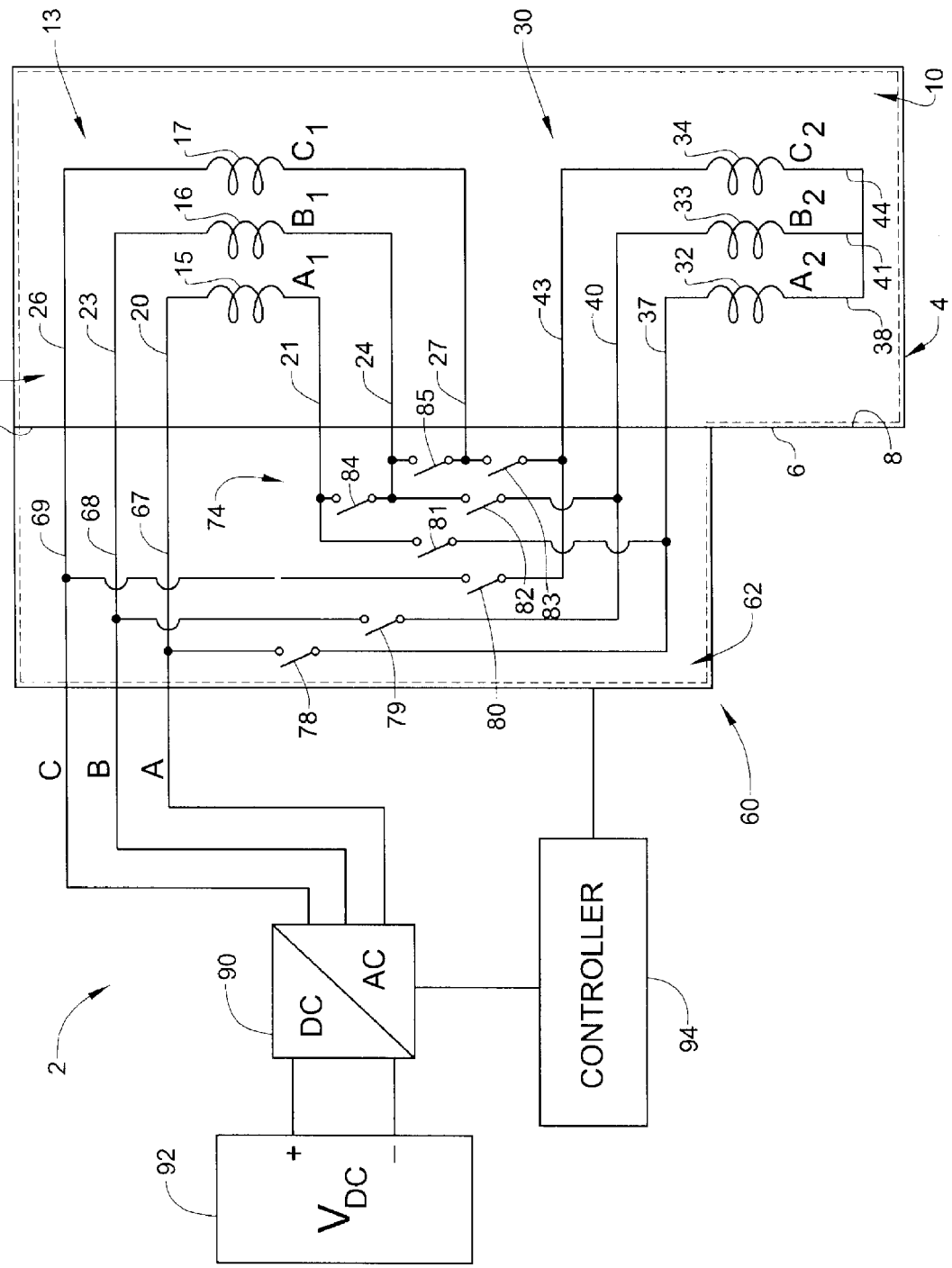
FIG. 1 schematically depicts an electric machine including a switch module according to an exemplary embodiment.

A detailed description of one or more embodiments of the disclosed apparatus is presented herein by way of exemplification and not limitation with reference to the Figures.

An electric machine, shown in the form of an electric motor, in accordance with an exemplary embodiment is indicated generally at 2. Electric machine 2 includes a housing 4 having an exterior surface 6 and an internal surface 8 that defines an interior portion 10. Electric machine 2 includes a stator 11 including a first plurality of windings 13. First plurality of windings 13 includes three windings $A_1$, $B_1$, and $C_1$ shown at 15-17 respectively. Winding 15 includes a first lead or conductor 20 and a second lead or conductor 21. Similarly, winding 16 includes a first lead 23 and a second lead 24, and winding 17 includes a first lead 26 and a second lead 27. Stator 11 is also shown to include a second plurality of windings 30. Second plurality of windings 30 includes three windings $A_2$, $B_2$, and $C_2$ shown at 32-34. Combined, windings 15-17 and 32-34 define a number of phases A, B, C (not separately labeled). Winding 32 includes a first lead or conductor 37 and a second lead or conductor 38. Similarly, winding 33 includes a first lead 40 and a second lead 41, and winding 34 includes a first lead 43 and a second lead 44.

Electric machine 2 also includes a switch module 60 which, in accordance with the embodiment shown, is arranged within housing 4. Switch module 60 includes an interior section 62 that is thermally isolated from interior portion 10 by a divider 65. Switch module 60 includes a plurality of power terminals 67-69 that correspond to the number of phases which, in the exemplary embodiment shown, include phases A, B, and C. Switch module 60 also includes a plurality of switch members 74. In the exemplary embodiment shown, switch members 74 take the form of insulated-gate bipolar transistors (IGBTs), however it should be understood that other forms of switches can also be employed. Switch members 74 are linked to the first and second pluralities of windings 13 and 30 by a plurality of conductors (not separately labeled) as will be discussed more fully below.

In accordance with one aspect of the exemplary embodiment, switch members 74 include one (1) less than three (3) times the number of phases (N). That is, the number of switches is 3N−1. In the exemplary embodiment shown, electric machine 2 includes three (3) phases such that the plurality of switch members 74 include a first switch member 78 that links power terminal 67 with first lead 20 of winding 15. A second switch 79 links power terminal 68 with first lead 23 of second winding 16, and a third switch 80 links power terminal 69 with first lead 26 of winding 17. A fourth switch 81 links second lead 21 of winding 15 with first lead 37 of winding 32. A fifth switch 82 links second lead 24 of winding 16 with first lead 40 of winding 33. A sixth switch 83 links second lead 27 of winding 17 with first lead 43 of winding 34. A seventh switch 84 links second lead 21 of winding 15 with second lead 24 of winding 16, and an eight switch 85 links second lead 24 of winding 16 with second lead 27 of winding 17.

Figure 2:
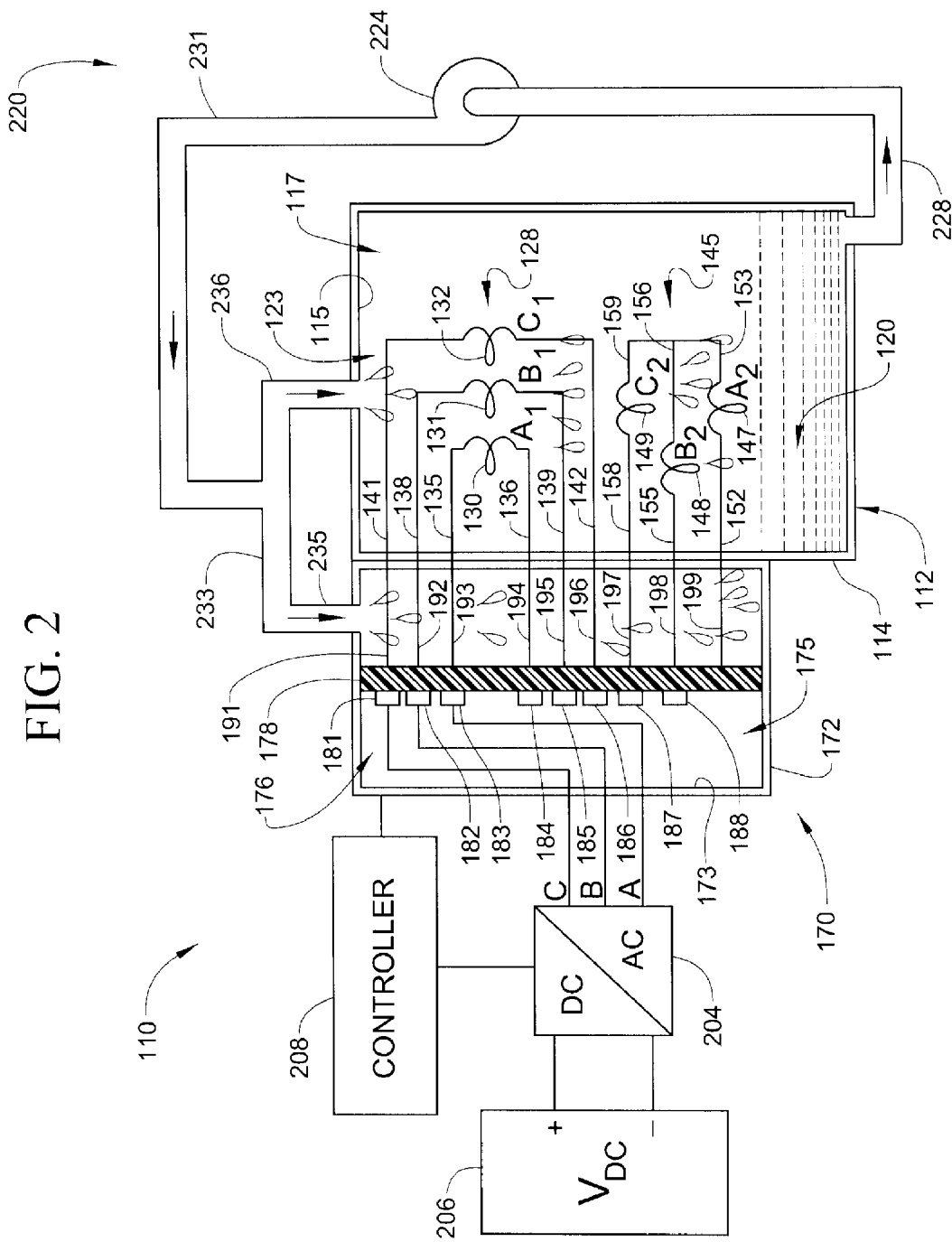
FIG. 2 schematically depicts an electric machine including a switch module according to another exemplary embodiment.

In further accordance with the exemplary embodiment, switch module 60 is linked to an inverter 90 by a number of conductors (not separately labeled) equal to the number of phases. In the exemplary embodiment shown, inverter 90 is linked to switch module 60 by three (3) conductors. Inverter 90 transforms a DC voltage and current from a DC voltage source 92 to an AC voltage and current that is passed to first and second plurality of windings 13 and 30 by way of switches 78-85. Electric machine 2 is also shown to include a controller 94 linked between inverter 90 and switch module 60. Controller 94 selectively activates switches 78-85 to establish one of a first electrical connection configuration and a second electrical connection configuration of the plurality of windings 13 and 30. In accordance with one aspect of the exemplary embodiment, the first electrical connection configuration is a series connection of the plurality of windings 13 and 30 and the second electrical connection configuration is a parallel connection of first and second plurality of windings 13 and 30. When a series connection is desired, controller 94 opens switch members 78-80, and 84-85, and closes switch members 81-83. When a parallel connection is desired, controller 94 closes switch members 78-80 and 84-85 and opens switch members 81-83. In addition, controller 94 establishes a desired timing between inverter 90 and electric machine 2. That is, controller 94 may disconnect inverter 90 when changing position of switch members 78-85. Of course, it should be understood that, in addition to series and parallel connections, switches 78-85 may be configured to establish a wide range of electrical connection configurations including wye connections, delta connections and any combinations thereof Reference will now follow to FIG. 2 in describing an electric machine 110 in accordance with another exemplary embodiment. Electric machine 110 includes a housing 112 having an exterior surface 114 and an interior surface 115 that defines an interior portion 117. In the exemplary embodiment shown, interior portion 117 includes a sump 120. Interior portion 117 also houses a stator 123 having a first plurality of windings 128 which, in the exemplary embodiment shown, includes three windings $A_1$, $B_1$, and $C_1$ shown at 130-132 respectively. Winding 130 includes a first lead or conductor 135 and a second lead or conductor 136. Similarly, winding 131 includes a first lead 138 and a second lead 139, and winding 132 includes a first lead 141 and a second lead 142. Stator 123 is also shown to include a second plurality of windings 145. In a manner similar to that described above, second plurality of windings 145 includes three windings $A_2$, $B_2$, and $C_2$ shown at 147-149. Combined, windings 130-132 and 147-149 define a number of phases A, B, C (not separately labeled). Winding 147 includes a first lead or conductor 152 and a second lead or conductor 153. Similarly, winding 148 includes a first lead 155 and a second lead 156, and winding 149 includes a first lead 158 and a second lead 159.

In accordance with the exemplary embodiment shown, electric machine 110 includes switch module 170 mounted at housing 4. Switch module 170 includes an exterior surface section 172 and an interior surface section 173 that defines an interior section 175. The term "mounted at" should be understood to mean that switch module 170 may be mounted to housing 4, or directly adjacent to housing 4 and joined to electric machine 2 through a short wiring harness. With this arrangement, exterior surface 114 of housing 112 provides a thermal barrier between interior portion 117 and interior section 175. In a manner similar to that described above, switch module 170 includes a plurality of switch members 176 that are operatively connected to first and second plurality of windings 128 and 145. The plurality of switch members 176 include a number of switch members that is one (1) less than three (3) times the number of phases (N) or 3N−1 as discussed above and are mounted to a substrate 178. In the exemplary embodiment shown, switch module 170 includes eight (8) switch members 181-188 connected to first and second plurality of windings 128 and 145 as described above. Switch members 181-188 are connected to windings 130-132 and windings 147-149 by a plurality of conductors 191-199. In a manner also similar to that described above, an inverter 204 couples a DC voltage source 206 to switch module 170. Inverter 204 is linked to switch module 170 by a number of conductors (not separately labeled) equal to the number of phases. In the exemplary embodiment shown, inverter 204 is linked to switch module 170 by three (3) conductors. A controller 208 is linked to inverter 204 and switch module 170. Controller 208 selectively activates switch members 181-188 to establish a series or parallel connection of windings 130-132 and windings 147-149.

During operation of electric machine 2, exterior surface 114, along with any provided insulation, may not be sufficient to minimize heat generated by electrical flow through windings 130-132 and windings 147-149 from impacting performance of switch members 181-188. Thus, in accordance with the exemplary embodiment shown, electric machine 2 includes a cooling system 220. Cooling system 220 includes a pump 224 that urges a coolant such as air, water or oil, through interior portion 117 and interior section 175. More specifically, cooling system 204 includes a first conduit 228 that extends from sump 120 to pump 224. A second conduit 231 passes from pump 224 to a branch conduit 233. Branch conduit 233 is fluidly connected to interior portion 117 and interior section 175 via fourth and fifth conduits 235 and 236 respectively. With this arrangement, cooling system 204 enhances heat transfer away from conductors 191-198 to minimize any heat effect on switch members 181-188.

At this point it should be understood that the exemplary embodiments describe a system for switching windings of an electric machine between series and parallel configurations while minimizing heat exposure to associated switch members. It should also be understood that the particular type of cooling system employed could vary. It should be further understood that a cooling system could be employed in combination with mounting the switch module internal to the housing. It should be also further understood that an electric machine including the switch module to an exterior of the housing can be constructed without a separate cooling system. Switching an electric motor between series and parallel configuration expands an overall operational envelope to enhance operation. Each configuration, series, parallel, provides various benefits. By allowing the electric machine to switch between configurations, efficiency is increased and energy consumption is decreased.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing;
   a stator arranged within the housing, the stator including a plurality of stator windings that define a number of phases;
   a switch module mounted at the housing, the switch module including a plurality of switch members that are operatively connected to the plurality of stator windings, the plurality of switch members being configured and disposed to selectively establish one of a first electrical connection configuration and a second electrical connection configuration of the plurality of stator windings; and
   a cooling system operatively coupled to the switch module and the housing, the cooling system configured and disposed to guide a cooling fluid adjacent the plurality of switch members, the cooling system including a sump provided in one of the housing and the switch module, a first conduit fluidly connected to the sump, a second conduit fluidly connected to the first conduit and the housing, and a third conduit fluidly connected to the second conduit and the switch module, wherein the cooling system is configured and disposed to pass a cooling fluid through each of the housing and the switch module.

2. The electric machine according to claim 1, wherein the first electrical connection configuration is a series connection and the second electrical connection configuration is a parallel connection.

3. The electric machine according to claim 1, wherein the plurality of switch members are thermally isolated from the plurality of stator windings.

4. The electric machine according to claim 1, further comprising: a plurality of conductors electrically connecting the plurality of switch members and the plurality of stator windings.

5. The electric machine according to claim 4, wherein the cooling flow is a fluid.

6. The electric machine according to claim 5, wherein the fluid is passed over the plurality of conductors.

7. The electric machine according to claim 6, wherein the fluid is one of an oil, air, and water.

8. The electric machine according to claim 1, further comprising: a pump fluidly connected to the cooling system, the pump guiding the cooling fluid from the sump through each of the housing and the switch module.

9. The electric machine according to claim 1, wherein the sump is arranged in the housing.

10. The electric machine according to claim 1, wherein the plurality of switch members comprise insulated-gate bipolar transistors (IGBTs).

11. The electric machine according to claim 1 wherein the plurality of windings define three phases.

12. The electric machine according to claim 11, wherein the plurality of switch members comprise no more than eight switch members.

13. The electric machine according to claim 1, wherein the switch module is mounted to an exterior surface of the housing.

14. The electric machine according to claim 1, wherein the switch module is mounted within the housing.

15. An electric machine comprising:
a housing;
a stator arranged within the housing, the stator including a plurality of stator windings that define a number of phases;
a switch module mounted at the housing, the switch module including a plurality of switch members that are operatively connected to the plurality of stator windings, the plurality of switch members being configured and disposed to selectively establish one of a first electrical connection configuration and a second electrical connection configuration of the plurality of stator windings, wherein the plurality of switch members comprise one less than three times the number of phases.

16. An electric machine comprising:
a housing;
a stator arranged within the housing, the stator including a plurality of stator windings that define a number of phases;
a switch module mounted at the housing, the switch module including a plurality of switch members that are operatively connected to the plurality of stator windings, the plurality of switch members being configured and disposed to selectively establish one of a first electrical connection configuration and a second electrical connection configuration of the plurality of stator windings;
an inverter operatively connected to the plurality of switch members, the inverter being coupled to the switch module by a number of conductors equal to the number of phases of the electric machine; and
a controller electrically coupled to the inverter and the switch module, the controller selectively activating the switch members and synchronizing operation of the inverter and switch module.

* * * * *